(12) United States Patent
Aas

(10) Patent No.: US 9,565,533 B1
(45) Date of Patent: *Feb. 7, 2017

(54) CROWD CONGESTION DETECTION

(71) Applicant: International Business Machines Corporation, Armonk, NY (US)

(72) Inventor: Cecilia J. Aas, Saffron Walden (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/013,596

(22) Filed: Feb. 2, 2016

Related U.S. Application Data

(63) Continuation of application No. 14/820,111, filed on Aug. 6, 2015.

(51) Int. Cl.
*H04M 11/04* (2006.01)
*H04W 4/02* (2009.01)
*H04W 28/02* (2009.01)

(52) U.S. Cl.
CPC .............. *H04W 4/027* (2013.01); *H04W 4/028* (2013.01); *H04W 28/0226* (2013.01)

(58) Field of Classification Search
CPC ............ G06Q 30/0205; G06Q 30/0261; G06Q 30/0267
USPC ...................................... 455/404.2
See application file for complete search history.

(56) References Cited

U.S. PATENT DOCUMENTS

| 2014/0122040 A1* | 5/2014 | Marti ................. G06F 17/5009 703/6 |
| 2014/0201276 A1* | 7/2014 | Lymberopoulos ... G06Q 10/103 709/204 |
| 2014/0340405 A1 | 11/2014 | dos Santos et al. |

OTHER PUBLICATIONS

Bernecker et al., "Activity Recognition on 3D Accelerometer Data (Technical Report)", Technical Report, Institute for Informatics, Ludwig-Maximilians-Universität München, Germany, 2012, 22 pages, <http://www.dbs.ifi.lmu.de/Publikationen/Papers/Sendsor2012_TR.pdf>.
"How Google Tracks Traffic", NCTA, Platform Technology, TV & The Future, Jul. 3, 2013, 1 page, <https://www.ncta.com/platform/broadband-internet/how-google-tracks-traffic/>.
Kwapisz et al., "Activity Recognition using Cell Phone Accelerometers", SensorKDD'10, Jul. 25, 2010, Copyright 2010 ACM, 9 pages.

(Continued)

*Primary Examiner* — Charles Appiah
*Assistant Examiner* — Randy Peaches
(74) *Attorney, Agent, or Firm* — Maeve M. Carpenter

(57) ABSTRACT

An approach for crowd congestion detection, the approach determines one or more selected locations. The approach determines a frequency spectrum history of one or more users within the one or more selected locations. The approach determines a location of the one or more users within the one or more selected locations. The approach determines a frequency spectrum of the one or more users within the one or more selected locations. The approach determines a crowding measure for the one or more selected locations based, at least in part, on the frequency spectrum history and the frequency spectrum of the one or more users within the one or more selected locations. The approach ranks the one or more selected locations based, at least in part, on the crowding measure.

1 Claim, 4 Drawing Sheets

(56) References Cited

OTHER PUBLICATIONS

Mannini et al., "Machine Learning Methods for Classifying Human Physical Activity from On-Body Accelerometers", NCBI, Sensors (Basel), 2010; 10(2), pp. 1154-1175, Published online: Feb. 1, 2010, doi: 10.3390/s100201154 <http://www.ncbi.nlm.nih.gov/pmc/articles/PMC3244008/>.

Mostayed et al., "Abnormal Gait Detection Using Discrete Fourier Transform", International Journal of Hybrid Information Technology, vol. 3, No. 2, Apr. 2010, 8 pages, <http://www.sersc.org/journals/IJHIT/vol3_no2_2010/1.pdf>.

Nishimura et al., "Detecting Smoothness of Pedestrian Flows by Participatory Sensing with Mobile Phones", ISWC'14, Sep. 13-17, 2014, pp. 15-18, <http://dx.doi.org/10.1145/2634317.2642869>.

Ohara et al., "Gait Volume : Spatio-Temporal Analysis of Walking", 2003 In Proc. MFI, 12 pages, <http://www.am.sanken.osaka-u.ac.jp/~sagawa/pdf/omnivis04.pdf>.

"Pitch detection algorithm", From Wikipedia, the free encyclopedia, last modified on Feb. 5, 2015, 4 pages, , <http://en.wikipedia.org/wiki/Pitch_detection_algorithm>.

Roggen et al., "Recognition of Crowd Behavior from Mobile Sensors with Pattern Analysis and Graph Clustering Methods", Article accepted for publication in AIMS Networks and Heterogeneous Media, Sep. 8, 2011, 24 pages, <Sarxiv.org/pdf/1109.1664v1>.

Smith, "Google Maps Navigation adds live traffic re-routing", Mar. 7, 2011, 3 pages, <http://www.techradar.com/news/car-tech/satnav/google-maps-navigation-adds-live-traffic-re-routing-934037>.

Techbitar, "Geo Data Logger: Arduino+GPS+SD+Accelerometer to log, time-stamp, and geo-tag sensor data", Instructables, updated Oct. 17, 2013, 16 pages, © Autodesk, Inc., <http://www.instructables.com/id/Geo-Data-Logger-ArduinoGPSSDAccelerometer-to-l/>.

List of IBM Patents or Patent Applications Treated as Related (Appendix P), filed herewith.

U.S. Appl. No. 14/820,111, filed Aug. 6, 2015.

* cited by examiner

CROWD CONGESTION DETECTION

BACKGROUND

The present invention relates generally to determining crowd congestion, and more particularly, to determining pedestrian crowding in a location based on pedestrian movement.

Typically, crowd congestion may be measured by calculating the density of accelerometer devices (i.e., pedestrian devices, such as mobile devices, capable of collecting accelerometer data) in a location appearing to show a pedestrian's walking pattern. Crowd congestion may also be measured by averaging the speed of a pedestrian's movements, or by comparing a pedestrian's drift velocity to the pedestrian's instaneous velocity while the pedestrian moves from one point to another within a location.

SUMMARY

Aspects of the present invention provide a method, computer program product, and a computer system for crowd congestion detection, in accordance with an embodiment of the present invention. The method includes determining, by one or more computer processor, one or more selected locations. The method includes determining, by one or more computer processor, a frequency spectrum history of one or more users within the one or more selected locations. The method includes determining, by one or more computer processor, a location of the one or more users within the one or more selected locations. The method includes determining, by one or more computer processor, a frequency spectrum of the one or more users within the one or more selected locations. The method includes determining, by one or more computer processor, a crowding measure for the one or more selected locations based, at least in part, on the frequency spectrum history and the frequency spectrum of the one or more users within the one or more selected locations. The method includes ranking, by one or more computer processor, the one or more selected locations based, at least in part, on the crowding measure.

DETAILED DESCRIPTION

Embodiments of the present invention recognize, when determining crowding, systematic errors can be introduced when data from a particular device cannot be harnessed, a pedestrian's physical abilities are not included in determining the pedestrian's movement, or a pedestrian's path is not monitored.

Embodiments of the present invention provide the capability to determine a level of pedestrian crowding by determining how crowding impacts a pedestrian's ease of movement. Embodiments of the present invention provide the capability to determine pedestrian crowding in a location as described below with references to FIGS. 1-4.

Implementation of such embodiments may take a variety of forms, and exemplary implementation details are discussed subsequently with reference to the Figures.

Figure 1:
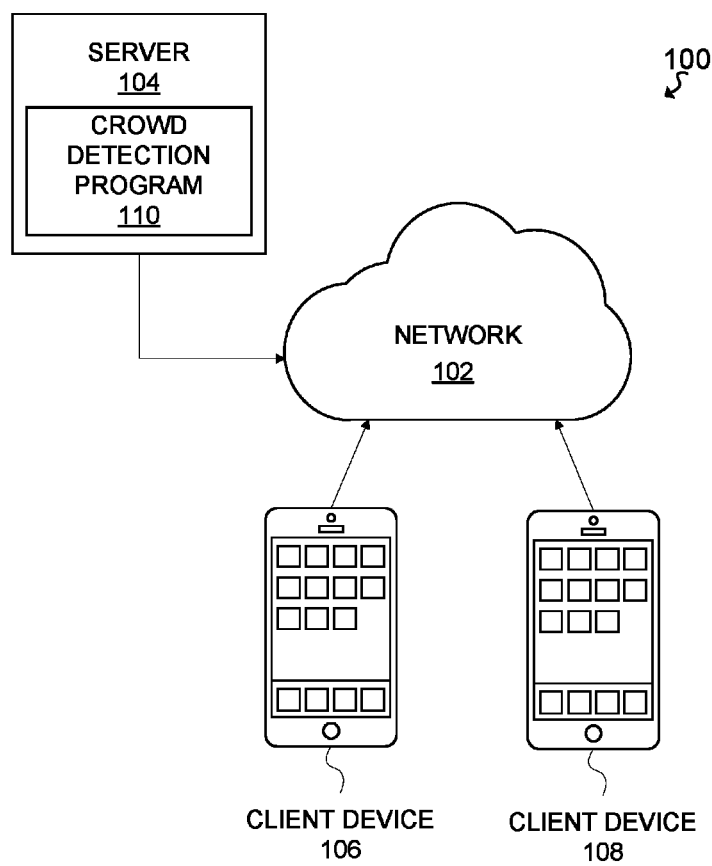
FIG. 1 is a functional block diagram illustrating a data processing environment, in accordance with an embodiment of the present invention.

FIG. 1 is a functional block diagram illustrating a data processing environment 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Data processing environment 100 includes network 102, server 104, which operates crowd detection program 110, and multiple client devices, such as client device 106 and 108.

Network 102 can be, for example, a local area network (LAN), a telecommunications network, a wide area network (WAN), such as the Internet, a virtual local area network (VLAN), or any combination that can include wired, wireless, or fiber optic connections. Network 102 can also include wire cables, wireless communication links, fiber optic cables, routers, switches and/or firewalls. Network 102 interconnects server 104, client device 106, and client device 108. In general, network 102 can be any combination of connections and protocols capable of supporting communications between server 104, client device 106, client device 108, and crowd detection program 110.

Server 104 is a web-based server hosting crowd detection program 110, in accordance with an embodiment of the present invention. In one embodiment, server 104 can be a web server, a blade server, a mobile computing device, a laptop computer, a tablet computer, a netbook computer, a personal computer (PC), a desktop computer, or any programmable electronic device or computing system capable of receiving and sending data, via network 102, and performing computer-readable program instructions. In another embodiment, server 104 can be a data center, consisting of a collection of networks and servers providing an IT service, such as virtual servers and applications deployed on virtual servers, to an external party. In another embodiment, server 104 represents a computing system utilizing clustered computers and components (e.g., database server computer, application server computers, etc.) that act as a single pool of seamless resources, such as in a cloud computing environment, when accessed within data processing environment 100. In some embodiments, server 104 can include a data storage repository (not shown) for storing data including, but not limited to, frequency spectrum history, one or more selected locations, a location of a user, and frequency spectra. Data storage repository can be one of, a web server, a mobile computing device, a laptop computer, a tablet computer, a netbook computer, a personal computer (PC), a desktop computer, or any programmable electronic device or computing system capable of receiving, storing, and sending files and data, and performing computer readable program instructions capable of communicating with server 104, client device 106, and client device 108, via network 102. In other embodiments, data storage repository can represent virtual instances operating on a computing system utilizing clustered computers and components (e.g., database server computer, application server computers, etc.) that act as a single pool of seamless resources when accessed within data processing environment 100.

In some embodiments, server 104 includes crowd detection program 110 for determining pedestrian crowding in a location based, at least in part, on accelerometer data and geographical location data. In an embodiment, crowd detection program 110 determines one or more selected locations. Crowd detection program 110 determines a frequency spectrum history of the users being monitored for a crowding measurement. Having determined a frequency spectrum history, crowd detection program 110 determines the location of each monitored user, and determines the frequency spectra of the monitored user's accelerometer data, in which the frequency spectra is added to the frequency spectrum history. Crowd detection program 110 determines a crowding measure for the one or more selected locations, and determines a ranking for the one or more selected locations based on the crowding measure. In other embodiments, the crowding measure and ranking can be used to plan walking routes, inform pedestrians to avoid busy streets in real time, or monitor locations (e.g. railway stations, airports, or large-scale events such as conferences, concerts, or sporting events).

In some embodiments, crowd detection program 110 operates on a central server, such as server 104, and can be utilized by one or more client devices, such as client device 106 and client device 108, via a mobile application download from the central server or a third-party application store, and executed on the one or more client devices. In another embodiment, crowd detection program 110 may be a software-based program, downloaded from a central server, such as server 104, and installed on one or more client devices, such as client device 106 and client device 108. In yet another embodiment, crowd detection program 110 can be utilized as a software service provided by a third-party cloud service provider (not shown).

In some embodiments, client device 106 and client device 108 are clients to server 104 and can be, for example, a desktop computer, a laptop computer, a tablet computer, a personal digital assistant (PDA), a smart phone, a thin client, or any other electronic device or computing system capable of communicating with server 104 through network 102. For example, client device 106 and client device 108 may be a mobile device capable of connecting to a network, such as network 102, to access the Internet and utilize location services (e.g., global positioning systems). In other embodiments, client device 106 and client device 108 can be any suitable types of mobile devices capable of running mobile applications, including smart phones, tablets, slate, or any type of device that runs a mobile operating system. In yet other embodiments, client device 106 and client device 108 can represent virtual instances operating on a computing system utilizing clustered computers and components (e.g., database server computer, application server computers, etc.) that act as a single pool of seamless resources when accessed within data processing environment 100.

In yet another embodiment, client device 106 and client device 108 can include a user interface (not shown) for providing an end user with the capability to interact with crowd detection program 110. For example, an end user may access crowd detection program 110 through the user interface to enable crowd detection program 110 to operate on the end user's device. A user interface refers to the information (such as graphic, text, and sound) a program presents to a user and the control sequences the user employs to control the program. In one embodiment, the user interface can be a graphical user interface (GUI). A GUI may allow users to interact with electronic devices, such as a keyboard and mouse, through graphical icons and visual indicators, such as secondary notations, as opposed to text-based interfaces, typed command labels, or text navigation.

In alternative embodiments, client device 106 and client device 108 can be any wearable electronic device, including wearable electronic devices affixed to eyeglasses and sunglasses, helmets, wristwatches, clothing, wigs, and the like, capable of sending, receiving, and processing data. For example, client device 106 and client device 108 may be a wearable electronic device, such as a wristwatch or an article of clothing, capable of collecting accelerometer data of a user's cyclical motion of moving his or her arms and legs and capable of sending data to crowd detection program 110.

Figure 2:
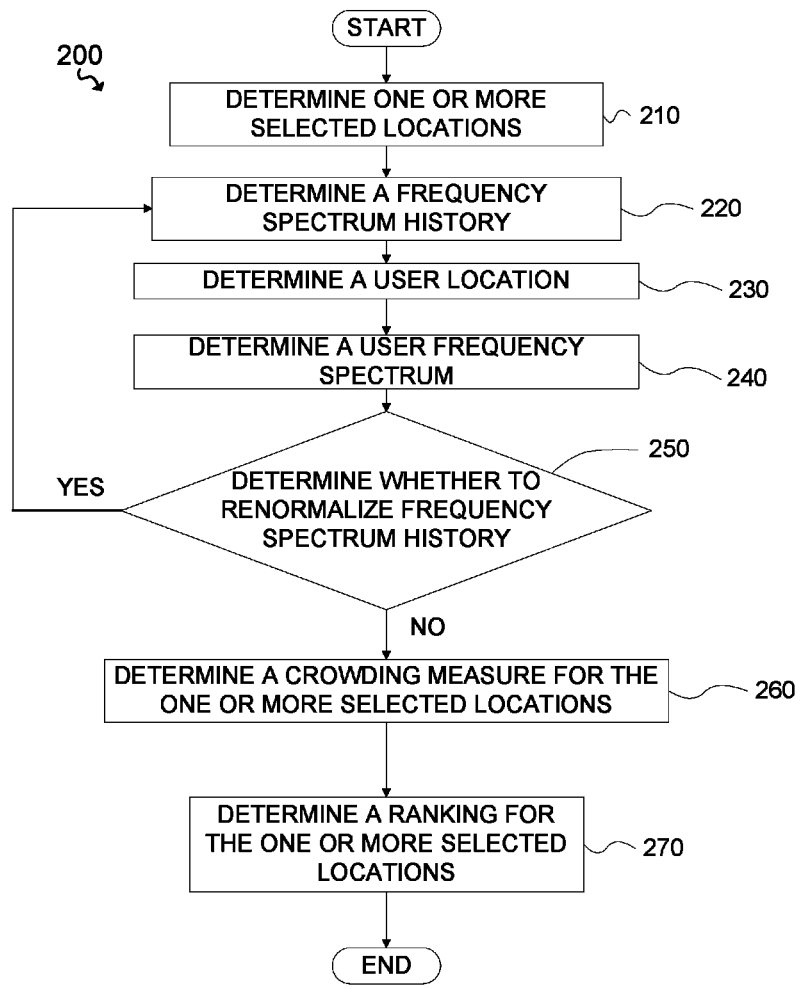
FIG. 2 is a flowchart illustrating operational steps of crowd detection program (such as the crowd detection program of FIG. 1), in accordance with an embodiment of the present invention.
Figure 3:
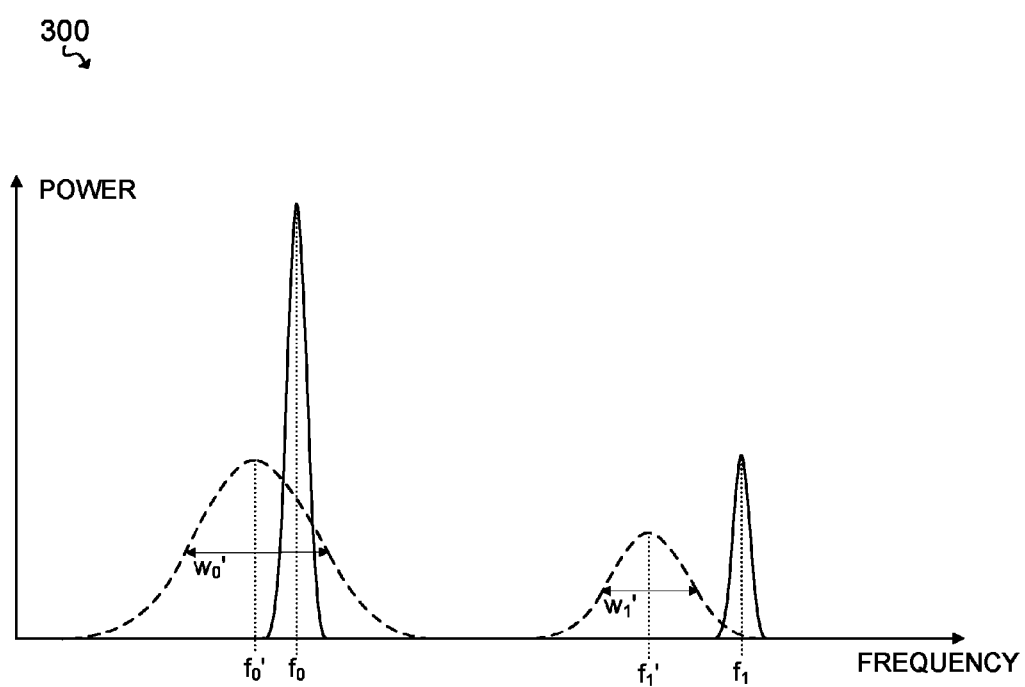
FIG. 3 is a graph depicting a frequency power spectrum illustrating an example of a user's cyclical motion, in accordance with an embodiment of the present invention.

FIG. 2 is a flowchart illustrating operational steps of crowd detection program 110, generally designated 200, in accordance with an embodiment of the present invention. In some embodiments discussed herein, devices, such as client device 106 and client device 108, can initiate crowd detection program 110 by connecting to server 104 via network 102.

Crowd detection program 110 determines one or more selected locations (210). In some embodiments, crowd detection program 110 determines one or more selected locations by retrieving the one or more selected locations from, for example, a database (not shown). In an embodiment, the one or more selected locations can be locations of an area (e.g. a street, a residential area, a playground, a parking lot etc.); a venue (e.g. a stadium, a concert arena, a park, etc.); an event of interest (e.g. a charity event, a party, a coarse of a marathon, etc.); or a section of an area, venue, or event of interest (e.g. a hallway of a stadium, a stairwell of a concert arena, a leg of a marathon coarse, etc.). In an embodiment, the one or more selected locations can be default locations, pre-defined locations, or user defined locations. In some other embodiments, crowd detection program 110 determines the one or more selected locations by utilizing geographical location data (e.g., global positioning system, location services, navigation, maps, latitudinal and longitudinal coordinates, etc.). In some embodiments, the one or more selected locations may vary in size. For example, crowd detection program 110 retrieves the one or more selected locations, in which a user defined the selected locations as being a street, a parking lot, a concert arena, and a stairwell of the concert arena. Crowd detection program 110 may utilize latitudinal and longitudinal coordinates to determine the locations of the street, the parking lot, the concert arena, and the stairwell of the concert arena.

Crowd detection program 110 determines a frequency spectrum history (step 220). In some embodiments, crowd detection program 110 determines the frequency spectrum history of one or more users by extracting, in a plurality of time windows, the Fourier transform of a user's accelerometer data. In some embodiments, crowd detection program 110 determines accelerometer data collected from a user's motion. Crowd detection program 110 may determine accelerometer data by retrieving accelerometer data from a device such as client device 106 or client device 108. In an embodiment, a user carries the device. In another embodiment, a user wears the device or attaches the device to the user using a method known in the art. In an embodiment, crowd detection program 110 determines a frequency spectrum history during one or more contiguous time windows, where the plurality of contiguous time windows can be a default time window, a pre-defined time window, or a user defined time window. In an embodiment, crowd detection program 110 extracts, in a plurality of contiguous time windows, the Fourier transform of a user's accelerometer data. In an embodiment, the plurality of contiguous time windows can be pre-set for each of the one or more users, where each of the plurality of contiguous time windows includes one or more time steps. For example, crowd detection program 110 may perform a Fourier transform on each of the one or more users' accelerometer data for 3 contiguous time windows, where each contiguous time window includes 10 time steps lasting 4-5 seconds each, to determine the frequency spectrum of the user's motion. In another embodiment, the plurality of contiguous time windows can vary for each of the one or more users. For example, crowd detection program 110 may perform a Fourier transform on a first user's accelerometer data using 4-5 second time steps to determine the frequency spectrum of the first user's motion, and crowd detection program 110 may perform a Fourier transform on a second user's accelerometer data using 6-7 second time steps to determine the frequency spectrum of the second user's motion. In an embodiment, crowd detection program 110 stores the user frequency spectrum history on a data storage repository (not shown) or on a device, such as client device 106 and client device 108.

In an embodiment, crowd detection program 110 analyzes the accelerometer data to determine if a user is moving in a cyclical motion, such as walking, running, cycling, or swimming. When crowd detection program 110 determines the user is moving in an unhindered cyclical motion (i.e. when pedestrian crowding is not affecting the user's cyclical motion allowing the user to move in a regular motion), crowd detection program 110 incorporates the frequency spectrum of the accelerometer data into the frequency spectrum history of the user.

In some embodiments, the time steps are configured to last for a duration of time to ensure that the Fourier transform of the user's accelerometer data is not disturbed by time window artifacts. For example, a time step having a 1 millisecond duration may induce disturbance when determining a user's cyclical pattern of motion, such as a user moving his or her legs and arm(s). In some embodiments, the time steps are configured to last for a duration of time to ensure that crowd detection program 110 produces a meaningful measure of a user's cyclical motion at a given point in time. For example, a time step of 3 hours is likely too long of a duration of time to ensure that the user's accelerometer data is not disturbed by time window artifacts, as the user's cyclical motion is likely to change significantly over the course of 3 hours. The frequency spectrum history contains information of peak positions and widths in the frequency spectra of the user's accelerometer data. Crowd detection program 110 may maintain the frequency spectrum history to normalize one or more absolute frequency properties of the accelerometer data with respect to the typical frequency characteristics of the accelerometer data from a user's cyclical motion. In other embodiments, crowd detection program 110 can retrieve the frequency spectrum history from a data storage repository (not shown) capable of storing the frequency spectrum history. Crowd detection program 110 may access the data storage repository via network 102. In yet another embodiment, where crowd detection program 110 determines that the frequency spectrum history of a user contains accelerometer data of a user exhibiting hindered cyclical motion, the hindered cyclical motion cannot be used to generate a baseline for the user's unhindered cyclical motion, and as such, crowd detection program 110 cannot normalize the data prior to evaluating crowding. In this situation, crowd detection program 110 renormalizes the frequency spectrum history of a user when evaluating crowding, which is described in further detail below.

In some embodiments, crowd detection program 110 can use an accelerometer to determine a user's cyclical pattern of motion, such as the user moving his or her legs and arm(s). By extracting the Fourier transform of the accelerometer data, crowd detection program 110 can determine the frequency spectrum of the accelerometer data. For example, when a user is performing an unhindered cyclical motion, for example running, walking, or cycling, sharp peaks may appear in the frequency spectrum. For example, when a user enters a busy street, the frequency spectrum is likely to be disturbed (e.g. the peaks are widened) by the sudden motions of erratically and frequently changing directions and speeds to avoid other pedestrians. The peaks may also shift downwards in frequency as a user's cyclical pattern of motion slows, such as a user walking slower or slowing down.

Crowd detection program determines a user location (step 230). In some embodiments, crowd detection program 110 determines whether a user is performing a cyclical motion by using physical activity detection classifiers known in the art. Where crowd detection program 110 does not detect cyclical motion of a user, crowd detection program 110 does not determine a user location of the user and ends (not shown). Where crowd detection program 110 detects cyclical motion of a user, crowd detection program 110 determines a user location of the user by utilizing a location services function on a device, such as client device 106 or client device 108, associated with a user or by utilizing a global positioning system (GPS) integrated on a device, such as client device 106 or client device 108, associated with a user. In an embodiment, determining a user location of the user includes determining whether the user is located within the bounds of the one or more selected locations. Responsive to a determination that the user is located within the bounds of the one or more selected locations, crowd detection program 110 may proceed with gathering frequency spectrum data for the user to use in subsequent steps for determining a crowding measure. Responsive to a determination that the user is not located within the bounds of the one or more selected locations, crowd detection program 110 may proceed with gathering frequency spectrum data for the user for purposes of generating a baseline for the user's unhindered cyclical motion, and does not proceed with subsequent steps for determining a crowding measure. In an embodiment, crowd detection program 110 stores the user location on a data storage repository (not shown) or on a device, such as client device 106 and client device 108.

Responsive to determining a user location, crowd detection program determines a user frequency spectrum (step 240). In some embodiments, crowd detection program 110 determines a user frequency spectrum by extracting, in contiguous time windows, the Fourier transform of a user's accelerometer data. The user frequency spectrum may include the peak positions and widths of the Fourier transform on the accelerometer data. In an embodiment, crowd detection program 110 determines a user frequency spectrum for a plurality of contiguous time windows, where the plurality of contiguous time windows can be a default time window, a pre-defined time window, or a user defined time window. In an embodiment, crowd detection program 110 extracts, in contiguous time windows, the Fourier transform of a user's accelerometer data for the time window. In an embodiment, the contiguous time windows used to determine a user frequency spectrum can be the same contiguous time windows used to determine a frequency spectrum history. In another embodiment, the contiguous time windows can be pre-set for each of the one or more user's. In yet another embodiment, the contiguous time windows can vary for each of the one or more users. In an embodiment, crowd detection program 110 stores the user frequency spectrum on a data storage repository (not shown) or on a device, such as client device 106 and client device 108.

In some embodiments, cyclical motions, such as walking, cycling, running, or swimming, can yield sharp peaks in the frequency spectrum. When the cyclical motion of the user is disturbed or hindered, such as when the user moves through a crowd, the peaks may widen. Where the user's motion is slowed, the peaks may shift downward in frequency. For example, as depicted in the frequency spectrum graph in FIG. 3, generally depicted as graph 300, during time step $t_0$, the user's cyclical motion yields an expected sharp peak $f_0$ in the frequency power spectrum. When the user's motion slows, the user's cyclical motion yields a downward shifted peak $f_0'$ with a peak width $w_0'$ greater than the peak width of $f_0$. If the user moves in a more congested area than $f_0$, the user's cyclical motion may also yield an expected sharp peak $f_1$ that has a lower power value on the frequency power spectrum than $f_0$. If the user's motion slows, the user's cyclical motion yields a downward shifted peak $f_1'$ with a peak width $w_1'$. In an embodiment, when crowd detection program 110 determines the cyclical motion of a user is unhindered, crowd detection program 110 adds the peak properties to the frequency spectrum history of the user.

Crowd detection program 110 determines whether to renormalize the frequency spectrum history (decision block 250). In an embodiment, crowd detection program 110 determines whether to renormalize the frequency spectrum by determining whether the user location is located within the bounds of the one or more selected locations. In an embodiment, responsive to a determination that the user location is not located within the bounds of the one or more selected locations, crowd detection program 110 (decision block 250, "YES" branch), crowd detection program 110 renormalizes the absolute frequency properties of the accelerometer data (i.e., to generate a baseline for the user's unhindered cyclical motion) to determine the frequency spectrum history (step 220) and continues as described above.

In an embodiment, responsive to a determination that the user location is within the bounds of the one or more selected locations, crowd detection program 110 determines not to renormalize the frequency spectrum history for the user (decision block 250, "NO" branch), and proceeds to determine a crowding measure for the one or more selected locations (step 260). In an embodiment, crowd detection program 110 determines a crowding measure for the one or more selected locations by retrieving data, such as the one or more selected locations, a frequency spectrum history, a user location, and a user frequency spectrum, from a plurality of users. In another embodiment, crowd detection program 110 determines a crowding measure for the one or more selected locations by retrieving data of a user. In an embodiment, crowd detection program 110 can retrieve the data from a data storage repository (not shown) or from a device, such as client device 106 and client device 108. In some embodiments, crowd detection program 110 determines a crowding measure for each of the one or more selected locations. In other embodiments, crowd detection program 110 determines a crowding measure for the totality of the one or more selected locations. Crowd detection program 110 determines the distribution of deviations in the frequency peak widths for each of the one or more users in a selected location, relative to the frequency peak width stored in each of the one or more users' frequency spectrum history. Crowd detection program 110 determines the average deviation in frequency peak width for the one or more users in each of the one or more selected locations. The average deviation in frequency peak width is the crowding measure. In some embodiments, crowd detection program 110 determines the width of the distribution of width deviations as a confidence value on the degree of crowding in this location. For example, if crowding causes a deviation in frequency peak width, there may be similar deviations for each of the users in a selected location, therefore the distribution of width deviations may be a narrow peak. If a user's individual behavior, such as stopping to look in a window or trying to cross a road, causes the deviations in frequency peak width, there may be a wider peak in the distribution of width deviations. In an embodiment, crowd detection program 110 stores the crowding measure on a data storage repository (not shown) or on a device, such as client device 106 and client device 108. In an embodiment, crowd detection program 110 stores the confidence value on a data storage repository (not shown) or on a device, such as client device 106 and client device 108.

Responsive to determining a crowding measure for the one or more selected locations, crowd detection program 110 determines a ranking for the one or more selected locations (step 270). In some embodiments, crowd detection program 110 determines a ranking for the one or more selected locations by retrieving the crowding measures for the one or more selected locations during the time window used to determine a user frequency spectrum. In another embodiment, crowd detection program 110 determines a ranking for the one or more selected locations by retrieving the crowding measures for the one or more selected locations during a time window used to determine a user frequency spectrum. In an embodiment, crowd detection program 110 ranks each of the retrieved crowding measures. In one embodiment, crowd detection program 110 can designate the ranking categorically from least crowded (i.e. smallest average frequency peak width deviation) to most crowded (i.e. largest average frequency peak width deviation). In another embodiment, crowd detection program 110 can designate the ranking as a numerical value on a weighted scale, for example 1-10, where 1 indicates a small degree of crowding and 10 indicates a high degree of crowding. Responsive to determining a ranking for the one or more selected locations, crowd detection program 110 ends. In an embodiment, crowd detection program 110 displays the ranking on a user interface (not shown).

In some embodiments, crowd detection program 110 determines the user frequency spectrum with a time step tuned to the user's cyclical pattern of motion prior to determining a crowding measure for the one or more selected locations. For example, person A has time step tо seconds, and person B has time step tB seconds. Person A may take a step to walk every 1 second, whereas person B may take a step to walk every 2 seconds. Crowd detection program 110 determines a crowding measure for person B with a time step of 2 seconds, while determining a crowding measure for person A with a time step of 1 second. In another embodiment, crowd detection program 110 determines the frequency spectrum of each user frequently and infrequently determine the crowding measure for the one or more selected locations. For example, crowd detection program 110 may be configured to determine the frequency spectrum of each user once every 4-5 seconds (i.e., frequently). In another example, crowd detection program 110 may be configured to determine the frequency spectrum of each user three times throughout a period of twenty-four hours (i.e., infrequently), such as once in the morning, once at midday, and once in the evening. In yet another embodiment, crowd detection program 110 may determine the frequency spectrum of each user with a time step tuned to the user's cyclical pattern of motion once every 4-5 seconds, and determine the crowding measure for the one or more selected locations three times throughout a period of twenty-four hours, such as once in the morning, once at midday, and once in the evening.

Figure 4:
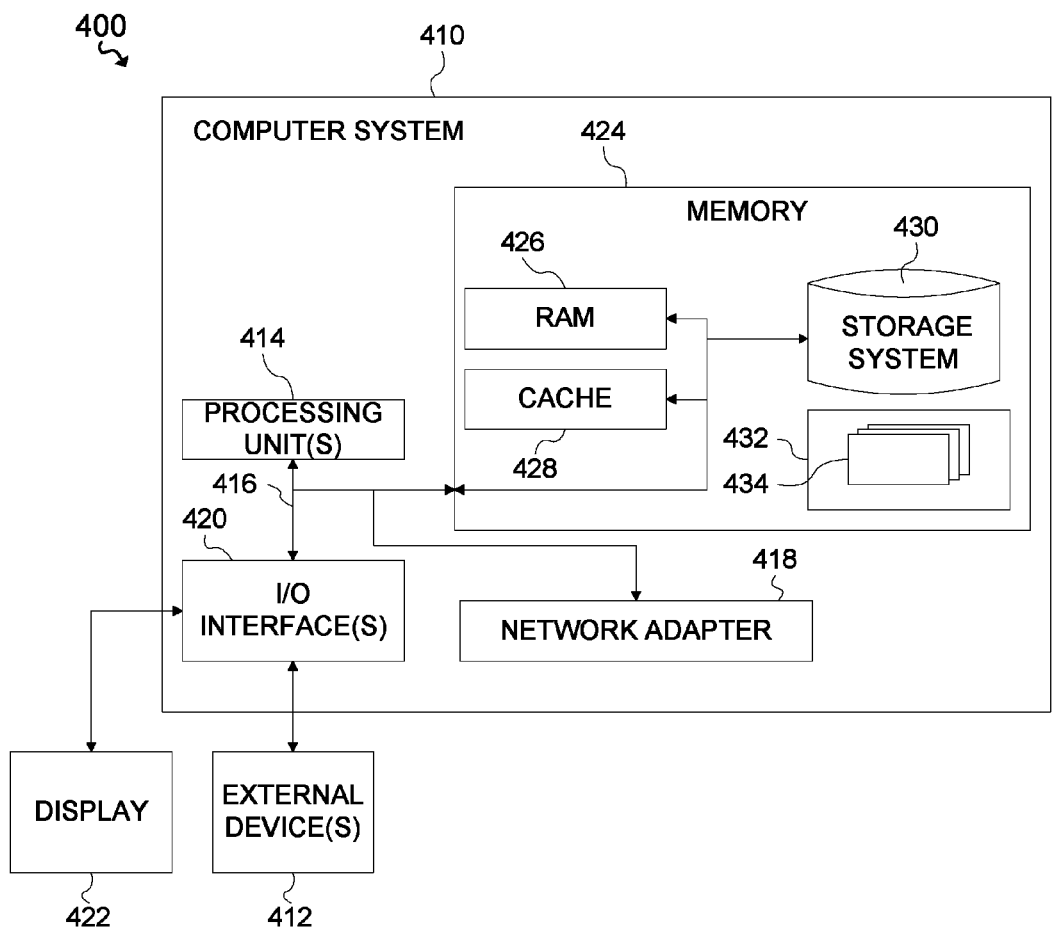
FIG. 4 is a block diagram depicting components of a data processing system (such as the server of FIG. 1), in accordance with an embodiment of the present invention.

FIG. 4 is a block diagram depicting components of computing device capable of operating crowd detection program 110, generally designated 400, in accordance with an embodiment of the present invention. FIG. 4 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 410. The components of computer system 410 may include, but are not limited to, one or more processors or processing unit 414, memory 424, and bus 416 that couples various system components including memory 424 to processing unit 414.

Bus 416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 410 typically includes a variety of computer system readable media. Such media may be any available media that is accessible by computer system 410, and it includes both volatile and non-volatile media, removable and non-removable media.

Memory 424 can include computer system readable media in the form of volatile memory, such as random access memory (RAM) 426 and/or cache memory 428. Computer system 410 may further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 416 by one or more data media interfaces. As will be further depicted and described below, memory 424 may include at least one computer program product having a set (e.g., at least one) of program modules that are configured to carry out the functions of embodiments of the invention.

Program/utility 432, having one or more sets of program modules 434, may be stored in memory 424 by way of example, and not limitation, as well as an operating system, one or more application programs, other program modules, and program data. Each of the operating systems, one or more application programs, other program modules, and program data, or some combination thereof, may include an implementation of a networking environment. Program modules 434 generally carry out the functions and/or methodologies of embodiments of the invention as described herein. Computer system 410 may also communicate with one or more external device(s) 412 such as a keyboard, a pointing device, a display 422, etc., or one or more devices that enable a user to interact with computer system 410 and any devices (e.g., network card, modem, etc.) that enable computer system 410 to communicate with one or more other computing devices. Such communication can occur via Input/Output (I/O) interface(s) 420. Still yet, computer system 410 can communicate with one or more networks such as a local area network (LAN), a general wide area network (WAN), and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives, and data archival storage systems may be used in conjunction with computer system 410.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for determining crowd congestion, the method comprising:

determining, by one or more computer processors, one or more selected locations, wherein determining includes retrieving the one or more selected locations from a database, wherein the one or more selected locations can be a default location, a pre-defined location, and a user defined location;

determining, by one or more computer processors, a frequency spectrum history of one or more users, wherein determining includes determining accelerometer data for each of the one or more users, wherein determining includes retrieving the accelerometer data for each of the one or more users from a device associated with each of the one or more users, extracting a Fourier transform of the accelerometer data for each of the one or more users in a plurality of contiguous time windows, determining a frequency spectrum of the one or more users moving in an unhindered cyclical motion based, at least in part, on the Fourier transform and the accelerometer data, and incorporating the frequency spectrum of the one or more users moving in an unhindered cyclical motion into the frequency spectrum history of the one or more users;

determining, by one or more computer processors, a location of the one or more users within the one or more selected locations, wherein determining includes determining whether the one or more users are performing a cyclical motion, wherein determining includes utilizing a plurality of physical activity detection classifiers, and responsive to determining the one or more users are performing a cyclical motion, locating the one or more users within the one or more selected locations utilizing one or more of a global positioning system and a location services function on a device associated with each of the one or more users;

determining, by one or more computer processors, a frequency spectrum of the one or more users within the one or more selected locations, wherein determining includes extracting a Fourier transform of accelerometer data for each of the one or more users within the one or more selected locations in a plurality of contiguous time windows, wherein the Fourier transform includes a plurality of peaks and a plurality of widths associated with cyclical motions of the one or more users;

determining, by one or more computer processors, a crowding measure for the one or more selected locations based, at least in part, on the frequency spectrum history and the frequency spectrum of the one or more users within the one or more selected locations, wherein determining includes determining a distribution of a plurality of deviations in one or more frequency peak widths for each of the one or more users in the one or more selected locations relative to one or more frequency peak widths stored in a frequency spectrum history for each of the one or more users, and determining an average deviation in the one or more frequency peak widths for each of the one or more selected locations, wherein the average deviation in the one or more frequency peak widths is the crowding measure; and ranking, by one or more computer processors, the one or more selected locations based, at least in part, on the crowding measure, wherein ranking includes retrieving a crowding measure for each of the one or more selected locations during a pre-determined time step, and designating, a ranking for each of the one or more selected locations based, at least in part on, an average frequency peak width deviation for each of the one or more selected locations.

* * * * *